Oct. 25, 1966     C. W. SOLTIS     3,280,540
SUPPORTING AND SEALING MEANS FOR FILTERS
Filed July 9, 1963     2 Sheets-Sheet 1

INVENTOR
Charles W. Soltis

BY Edward L. Amonette
Agent

Oct. 25, 1966 C. W. SOLTIS 3,280,540
SUPPORTING AND SEALING MEANS FOR FILTERS
Filed July 9, 1963 2 Sheets-Sheet 2
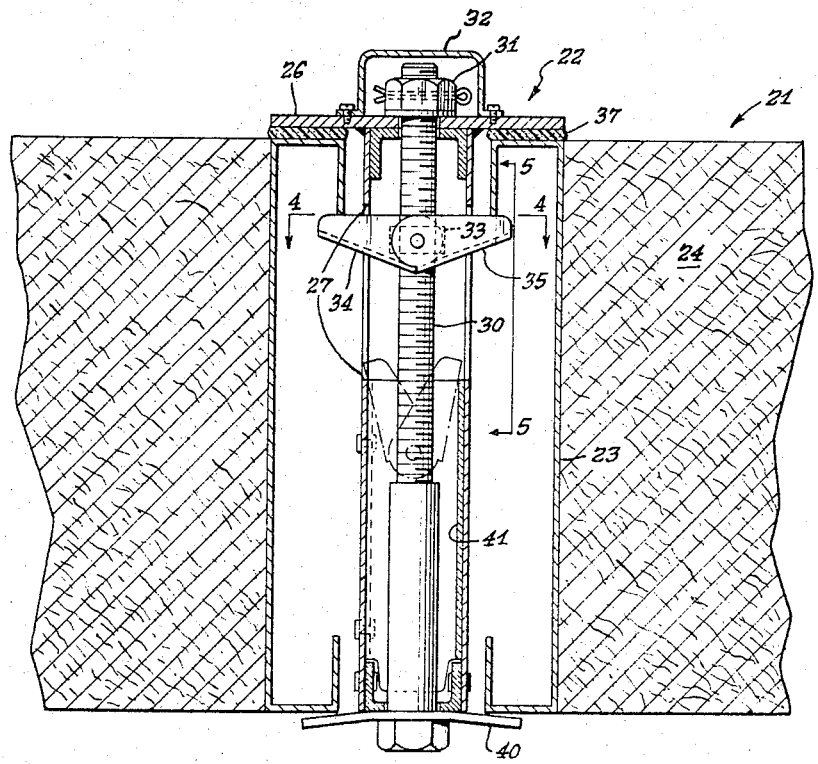
FIG. 3
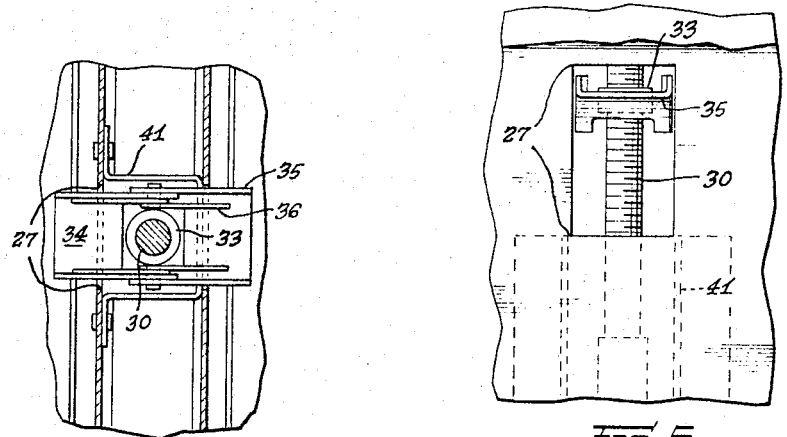
FIG. 4
FIG. 5
INVENTOR
Charles W. Soltis
BY Edward L. Amonette
Agent United States Patent Office 3,280,540
Patented Oct. 25, 1966

3,280,540
SUPPORTING AND SEALING MEANS
FOR FILTERS
Charles W. Soltis, Albuquerque, N. Mex., assignor to
Envirco, Inc., a corporation of New Mexico
Filed July 9, 1963, Ser. No. 293,597
6 Claims. (Cl. 55—483)

My invention relates to filter systems, and more specifically to supporting and sealing means for filters, its greatest value is when used with absolute filters, i.e., those filtering out 99.97% of all airborne particles of ³⁄₁₀ micron diameter or larger, but it also finds wide application wth filters of lesser efficency.

Absolute filter system are used to provide ultra-clean and germ-free environments in such locations as industrial clean rooms where sensitive instruments are fabricated, and in hospital operating rooms. In such systems the filters constitute a relatively large surface of the room such as a wall or ceiling, with air introduced into the room under pressure through the filters and exhausted through gratings or grills in the floor or on the other side of the room, that is, the opposite wall, or in the floor. A very general illustration of the type of arrangement may be seen in Germonprez Patent No. 2,291,220, dated July 28, 1942. Modern systems utilize banks of absolute filters made of a pleated continuous sheet of glass asbestos medium compressed into closely spaced pleats separated by aluminum or similar inserts. This filter medium is placed into a filter frame generally of plated or coated steel with double turned flanges to facilitate handling, although wooden frames are sometimes used. These filters range in thickness from five to eleven inches and a relatively high air pressure, on the order of one to three inches of water gauge, is required to force the air through the filter.

In order to utilize 100% of the efficiency of an absolute filter, the filter must be installed in the "duct," "plenum," or other air stream confinement in such a manner so as to be absolutely air tight around its sealing surfaces. Because of the ability of the filter to remove very fine particles (.3 micron=12 millionth of an inch) a leak around the filter seal the size of a pin point could result in a greatly decreased filter efficiency.

This fact, together with the fact that the filter has a relatively high pressure drop as it becomes loaded (up to a pressure of 2½ inches of water gauge) requires that the filter have a means of clamping so as to compress the filter gasket against a smooth air-tight flange. A previous method for accomplishing this seal used field-fabricated angle iron frames and brackets requiring the removal and replacement of a number of bolts each time the filter was serviced. Generally, part of the angle iron frame would also have to be removed before the filter could be serviced. Most methods also required the joints to be taped after each filter change.

All of the previous sealing and clamping methods required custom fabricating in the field for each application and were subject to variations in tolerances and sealing problems with the obvious result of loss of efficiency.

Formerly, absolute filters were installed in an air conditioning duct and the air filtered and distributed through conventional air conditioning outlets; however, with the advent of the laminar air flow principle, the absolute filter is normally installed in great numbers, completely covering the ceiling or wall. These walls or ceilings normally require a greater number of filters than conventional filtering systems, since to maintain laminar flow the size of the filter bank is dictated by the size of the ceiling or wall rather than by the volume of air to be moved. For convenience it becomes highly desirable to have a system of filters that can easily be removed and replaced from inside the room.

Since the filter media in an absolute filter is extremely delicate, and expensive, it must be handled with care to prevent tearing or rupturing.

It is an object of my invention to provide a supporting and sealing means for filters which enables fast installation of absolute filters in a bank, establishing a perfect seal at every joint.

Another object of my invention is to provide means for easy installation and removal of filters from inside a clean room or similar installation, without requiring access to the backs of the filters.

Still another object is to provide a retractable latching means which allows installation of filter cells in an overhead location by one person without danger of damage to the cell.

A further object of my invention is to provide a supporting and sealing means for filters which minimizes the distance between adjacent filter cells in a filter bank, thereby making possible more nearly perfect laminar flow from the bank.

Briefly, these and other objects not enumerated are accomplished by the use of a network of hollow members constituting a supporting frame, a number of retractable latching means being mounted within the hollow members and extending out therefrom through suitable apertures. Insertion of filter cells into openings in the network operates the latches, retaining the cells in place. Tightening of the latching means establishes a seal between each filter cell frame and a flange or stop located at the far side of each hollow member. The latching means are retracted to within the hollow members for removal of a cell, the cell (in the case of an overhead installation) then dropping to a secondary retainer which is easily adjusted for release of the cell.

A better understanding of my invention may be had by reading the more detailed description to follow, in conjunction with the appended claims and the attached drawing, in which:

FIG. 3 is a longitudinal sectional view of a preferred embodiment of my retractable latching means, taken along the line 3—3 of FIG. 1;

FIG. 4 is a cross sectional view of the latching means, taken along the line 4—4 of FIG. 3; and FIG. 5 is still another sectional view of the latching means, taken along the line 5—5 of FIG. 3.

Figure 1:
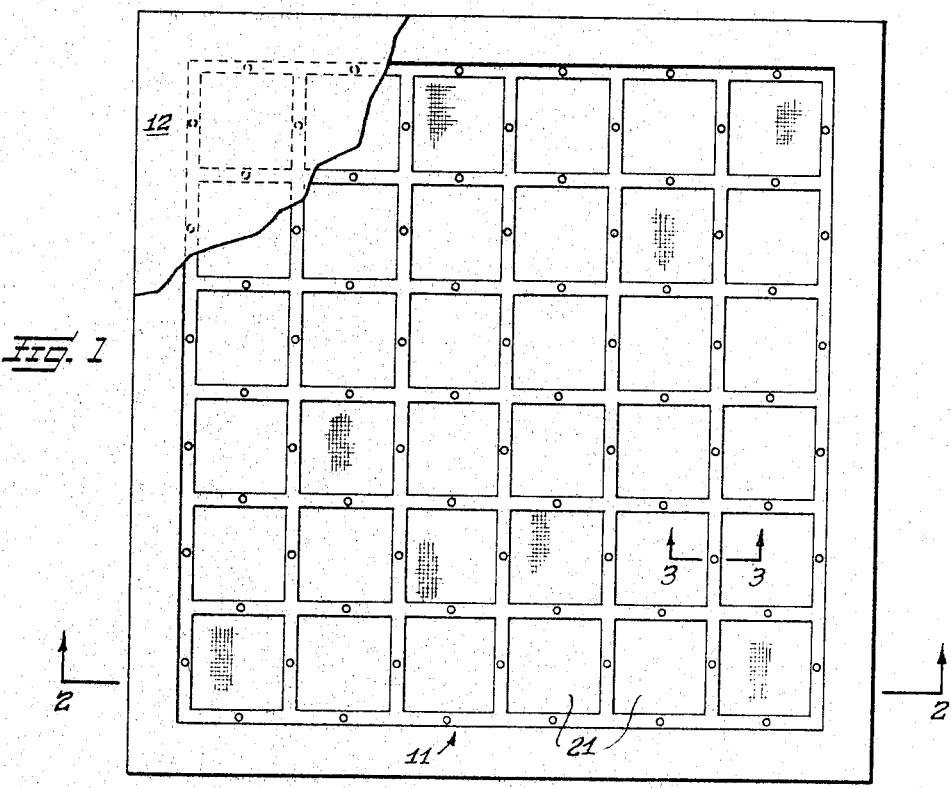
FIG. 1 is a top plan view of a room having a ceiling filter bank, including a preferred embodiment of my invention.
Figure 2:
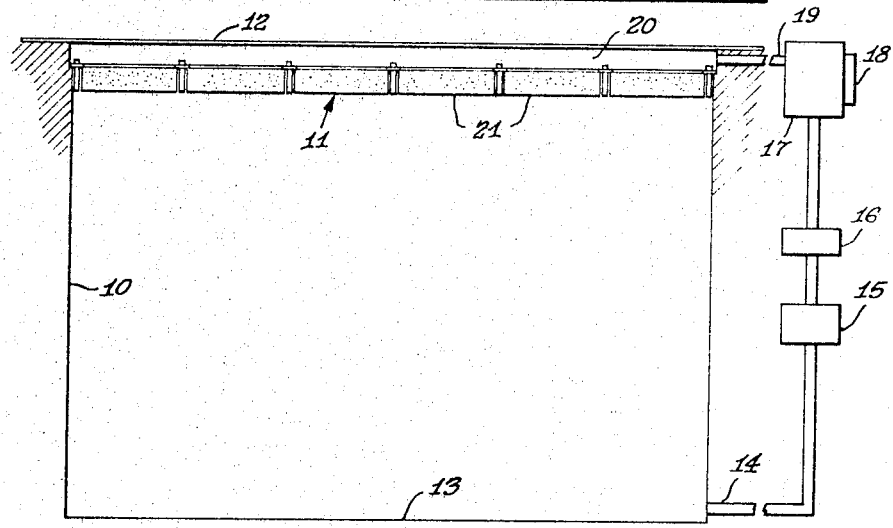
FIG. 2 is a sectional view of the room taken along the line 2—2 in FIG. 1, and additionally showing in block diagram form a typical air circulation system.

The general arrangement of an absolute filter ceiling installation is illustrated in FIGS. 1 and 2 which show the filters mounted to form the ceiling of the room with the air discharged through the floor. If desired for convenience, the filter may be mounted in the wall of the room with the air exhausted through the wall opposite the filters. The room consists of walls 10 and ceiling 12. The return system for exhausting the air can be a grill or perforated segment integral with the floor or adjacent to the floor 13 connected to the return duct 14. A suitably powered blower 15 forces the air upward through an optional pre-filter 16 through plenum 17 having a pressure regulating damper 18. Duct 19 carries the air into ceiling plenum 20 formed by the room ceiling 12 and the absolute filter bank 11 comprising a number of filter cells 21.

FIG. 3 shows an absolute filter cell 21 consisting of the metal frame 23 and filter media 24 mounted in supporting frame 22, which includes a structural member of generally rectangular hollow cross section with a top flange or stop 26, forming an element of generally T-shaped cross section to limit upward movement of the absolute filter cell 21.

Mounted within the hollow vertical portion or web 28 of supporting frame 22 is a bolt 30, secured at the top by cotter-pinned nut 31. A cap 32 is sealed against flange 26 to prevent air leaks, but is removable for disassembly. A toggle nut consisting of a threaded collar 33 to which is pivotally fastened a pair of pawls 34 and 35, is installed on the bolt, the pawls being spring biased by spring 36 to their extended positions shown, protruding through apertures 27 of web 28 beyond the extremity of filter frame 23. As shown, the toggle nut has been adjusted, by suitable turning of bolt 30, to retain the periphery of filter cell 21 abutting flange 26, and in sealing engagement therewith because of gasket 37.

Although the installation shown utilizes a flanged metal filter frame 23, it is obvious that the retractable latching means shown would be equally effective in working against the bottom of a wooden filter frame, provided there were a suitable lengthening of bolt 30. It also is obvious that only one pawl need be provided for the retention of filter cells at the edge of the bank, the operation of the invention remaining the same.

Removal of a filter cell is accomplished by turning bolt 30 in the opposite direction, retracting the toggle nut to within the supporting frame, the pawls folding inwardly when borne against the bottom edges of apertures 27. It is seen that the filter cells will be lowered with the pawls, dropping free when the pawls are retracted sufficiently to lose contact with the filter frames 23. To prevent damage to the cells, and possible injury to the worker, retainer 40 is provided at the bottom of supporting frame 22. This retainer is a tab no wider than the frame in one dimension, so that turning it at right angles to the position shown will allow release of the filter cell.

Housing 41 is mounted inside supporting frame 22, apertured to coincide with aperture 27, and having a width great enough for free action of the pawls. The purpose of the housing is to retain the pawls from turning with respect to the supporting frame when they are retracted therewithin.

Installation of a new filter cell is easily accomplished by adjusting the appropriate pawls on their respective bolts so that the pawls extend into the path of filter cell insertion, then simply inserting the cell until its frame latches into position beyond the pawls. Then the cell may be released, and the bolts tightened to effect the seal against the flanges. All this is accomplished from the most convenient side of the filter bank, usually from the room side, with a minimum of "down time" for the change. Thus, if a cell were damaged due to activity within a clean room, it could be quickly replaced with a small loss of working time.

While a preferred embodiment of my invention has been illustrated and described, it will be apparent that various changes and modifications may be made therein within the spirit and scope of the invention as defined in the claims below. Specifically, it is contemplated that other retractable latching means may be used, still keeping the thickness of the supporting frame to a minimum for good laminar flow. Also, the invention is equally useful in wall filter bank installations, and with single cells.

I claim as my invention:

1. A supported and sealed filter assembly comprising:
   a frame adapted to be mounted on an enclosure and having a plurality of substantially rectangular openings therein, said frame consisting of a plurality of connected together hollow members made up of a plurality of depending webs and a top flange extending laterally therefrom and surrounding said openings;
   a plurality of filter frames each having a top, bottom, and edge portion, each having filtering media therein, and adapted to be removably mounted in said openings with their edge portions adjacent said flanges;
   sealing gaskets mounted between the top of the filter frames and said top flange;
   a plurality of apertured housings mounted within the hollow portions of said members of said supporting frame and in spaced apart relation;
   retractable latching means for mounting the filter frames in the openings of said supporting frame and in engagement with said sealing gaskets;
   each of said latching means comprising a bolt extending through one of said housings;
   a threaded collar on each of said bolts;
   a pawl pivoted on each of said collars, said pawl being adapted to normally extend through the housing aperture and press a bottom portion of the filter frame into sealing engagement with said gasket;
   the rotation of said bolt in one direction moving said pawl to disengage said filter frame and to bear against an edge of said housing to pivot said pawl inwardly substantially within the confines of said housing.

2. Supporting and sealing means for high efficiency filters of a laminar flow filtering system comprising a filter cell supporting frame defining at least one opening of predetermined configuration for receiving a filter cell of corresponding configuration, said frame comprising a web and a flange extending laterally from one end thereof and adapted to cooperate with the filter cell in sealing the juncture therebetween, a latching means forming part of said supporting frame and having portions thereof within said web for extending into said opening and releasably supporting the cell in said opening and for cooperating in sealing the juncture between the cell and said flange and for being withdrawn from said opening for releasing the cell from said opening, said latching means including a toggle bolt having a pivotally mounted retractable pawl, means for causing said pawl to pivot into said opening to support the filter cell and to withdraw the pawl from said opening to permit removal of said cell, said latching means including spring biasing means for urging said pawl into said opening and said spring biasing means being adapted to be overcome by inserting the filter cell into said opening from the direction of the other end of said web and moving the filter cell towards said flange and into engagement with the pawl to permit the pawl to be overrun and pivoted from said opening, said spring biasing means urging said pawl back into said opening after at least a portion of said filter cell has passed, whereby the filter cell is adapted to be automatically latched into place when inserted into said opening, means for advancing said pawl towards said flange such that when said pawl is extended into said opening and supports a filter cell thereon such advance shifts said filter cell towards said flange, gasket means for sealing the juncture between the flange and said filter cell upon advance of said pawl towards said flange.

3. The invention in accordance with claim 2 wherein said web is hollow, said bolt extends from said web, said pawl having threaded means meshed with the bolt for moving the pawl towards or away from said flange and said pawl having surfaces engageable with surfaces of said web to cause said pawl to be retracted into said web when said pawl is shifted away from said flange upon rotation of said bolt and to extend from said web into said opening when said pawl is advanced towards said flange upon rotation of said bolt in the reverse direction.

4. The invention in accordance with claim 3 wherein said threaded means comprises an internally threaded collar, and means for preventing turning of the pawl relative to the supporting frame when the pawl is retracted.

5. The invention in accordance with claim 4 wherein the web is provided with opposed apertures communicating with the hollow interior thereof and said latching means includes two of the said pawls aligned with the apertures in the web and being in an extended position.

6. The invention in accordance with claim 2 wherein a filter cell is supported by said supporting frame, said cell comprising a predetermined filtering media and a filter frame supporting said media, said filter frame including an opening aligned with said pawl, said pawl being in an extended position and being disposed in the opening of said filter frame.

References Cited by the Examiner

UNITED STATES PATENTS

| | | |
|---|---|---|
| 1,247,621 | 11/1917 | Bennett. |
| 1,895,642 | 1/1933 | Preble _____ 55—483 X |
| 2,062,649 | 12/1936 | Hegan _____ 55—484 X |
| 2,616,327 | 11/1952 | Karitzky _____ 85—3 |
| 2,771,155 | 11/1956 | Palmore _____ 55—502 |
| 2,908,196 | 10/1959 | Apfelzweig _____ 85—3 |
| 3,063,224 | 11/1962 | Getzin _____ 55—493 |
| 3,093,401 | 6/1963 | Hagendoorn _____ 55—493 X |
| 3,100,557 | 8/1963 | Getzin _____ 55—490 X |

ROBERT F. BURNETT, *Primary Examiner.*